2 Sheets--Sheet 1.

A. L. BLACKMAN.

Improvement in Wheels for Vehicles.

No. 5,264.

Reissued Jan. 28, 1873.

Witnesses.

M. Gardner

Edw. W. Dorm

Inventor.

Albert L. Blackman

By D. W. Glassie

Atty

2 Sheets--Sheet 2.

A. L. BLACKMAN.

Improvement in Wheels for Vehicles.

No. 5,264.

Reissued Jan. 28, 1873.

Albert L. Blackman
By
D. W. Glassie
Atty
Inventor;

Attest;
M. Gardner
Edw. W. Dorn

5,264. WHEELS FOR VEHICLES. Albert L. Blackman, Cross Plains, Tenn., assignor of part interest to Samuel K. Schwenk and John E. Saunders. Patent No. 127,300, dated May 28, 1872.

*To all whom it may concern:*

Be it known that I, ALBERT L. BLACKMAN, of Cross Plains, in the county of Robertson, State of Tennessee, have invented certain Improvements in Wheels for Wagons, Buggies, and other Vehicles; and I do hereby declare that the following is a full, clear, and concise description of the same, reference being had to the accompanying drawing as forming a part of the specification.

My invention relates to certain improvements in the construction and arrangements of the component parts of a vehicle-wheel, more fully described and pointed out hereafter.

Figure 1:
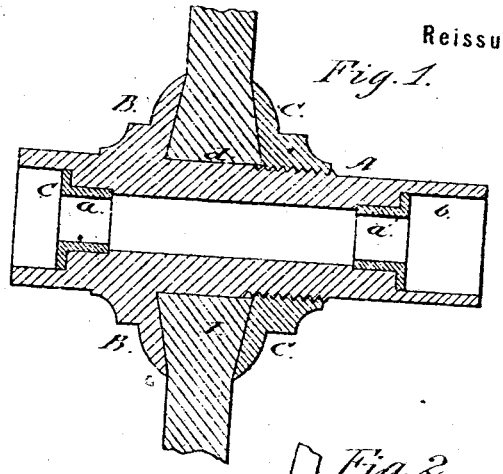
Figure 2:
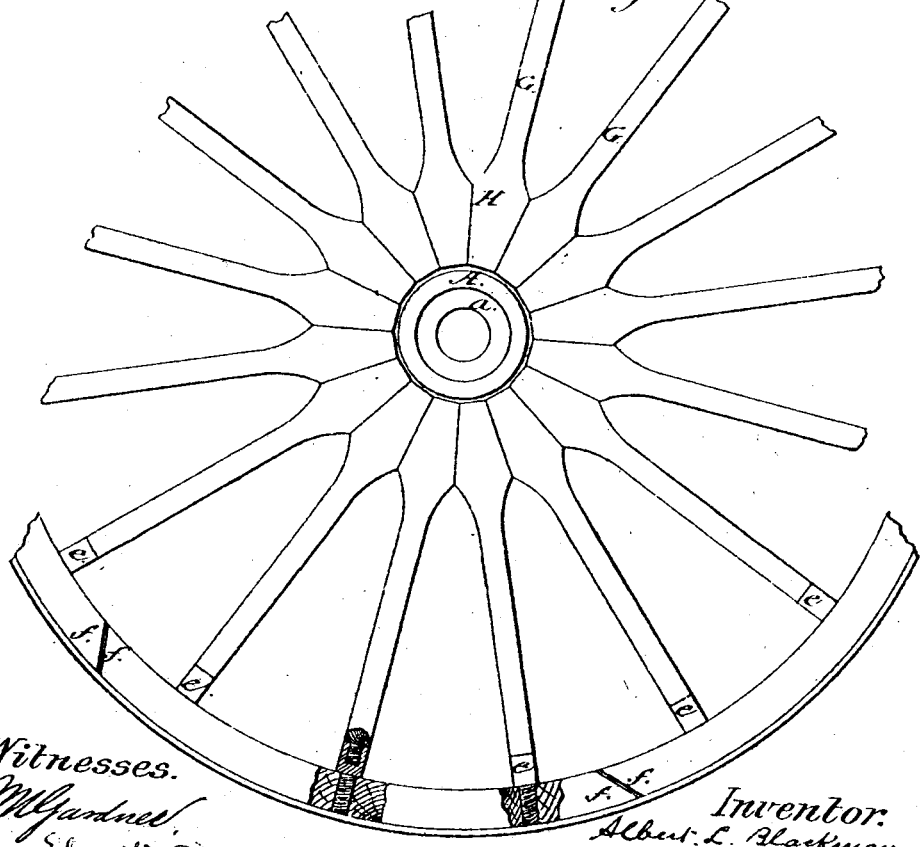
Figure 3:
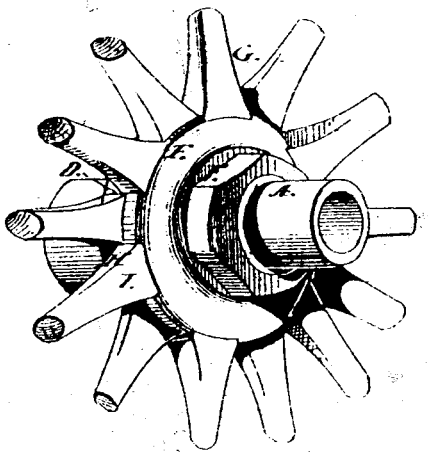
Figure 1:
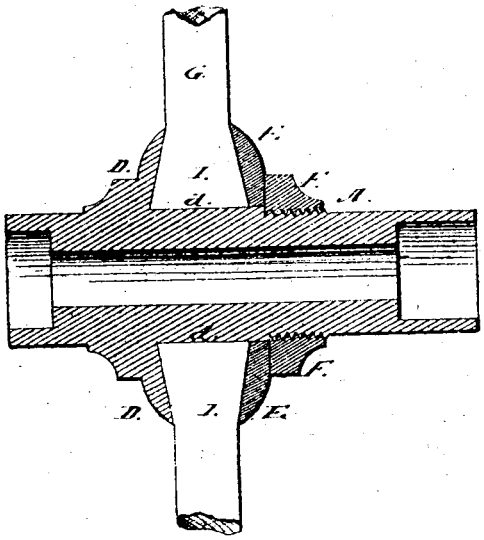

Figure 1 is a vertical section of the hub, showing the flanges or disks and the spokes in place, the form of the spokes one way, and the bearings in the cylinder. Fig. 2 is a front elevation of a wheel, showing the spokes in place, their form H, one way, and the rim and thimbles. Fig. 3 is a perspective view of the hub, spokes, and various parts of the wheel. Fig. 4 is a vertical section of the recessed flange or clamp-hub, showing the spokes in place, and the clamp-flange or confining-screw.

The hub consists of a hollow cylinder or tube, A, having a circular concave-shaped clamp, flange, or disk, B, cast with it and on its inner end, against which the spokes are held by an adjustable clamp, disk, or flange, C, that screws onto the cylinder from the outer end. This hollow tube A may be made with a circular and alternating recess or mortise-clamp flange, D, cast with it on its inner end, in the recess of which the spokes G may be placed in a "staggered" position, where they may be held with an adjustable corresponding alternating recess clamp flange, E, on the outer end of the hub, to close on the edge of the spokes to hold and keep them in place, and a flange-nut or confining-screw, F, to screw onto the tube A against flange E to govern its hold on the spokes. Two chilled-iron or steel bearings, *a a'*, that may be screwed or otherwise fastened into the hub at *b* and *c*, forming a bearing for the axle, or their equivalents, may be used. When worn out, these bearings, if removable, can be replaced, thereby saving the hub from wear.

By the foregoing arrangements and construction of a hub several important points are gained, among which are: The wheel can be made light without impairing its strength; it can be made quite straight without dish; the spokes can be taken out and replaced at will without injury to the hub or rim.

The spokes G are dressed at one end, H, trapezoidal or wedge-shape one way, and are made to rest side by side against each other in the space *d* between the disks, each spoke abutting against its neighbor, forming a complete circle and one mass. The base ends of the spokes I are cut dovetailed, corresponding to the space between the flanges, giving to this end a broad base, which, when resting on the face of the cast cylinder A, aids materially in overcoming any tendency toward a lateral movement; so that, when the clamp-flange or disk C or E is screwed home, the spokes are drawn tightly together, filling the angles formed by the disks, and are hugged down close onto the hub-body by a screw-pressure that draws toward the center, thereby preventing any displacement or tendency to dish the wheel.

By the use of the alternating recess flanges or clamps the wheel may be made, if necessary, perfectly straight.

On the extreme end of the spoke can be screwed a shouldered thimble screw-tenon, *e*, that also screws into the felly and forms an adjustable tenon for the spokes.

By this arrangement, and the arrangement of the parts of the hub, a spoke may be removed or replaced at will without injury to the hub or rim, and without removing the tire.

The fellies are joined by oblique instead of square-shouldered joints, *f*, which admits of tightening the tire without cutting the tire, and gives additional strength and firmness to the wheel-rim.

With my improvement and combination in vehicle-wheels they can be made light, firm, and durable. They can be refilled with spokes at will, and also new bearings.

Having now described all that is essential to describe to have my invention known and fully understood, what I deem and esteem as my invention, and ask to be protected by Letters Patent, is—

1. The combination of cast cylinder A having the concave-shaped flanged B on its inner end, and axle-bearings *a a'*, the adjustable concave flange C in their respective forms, or mechanical equivalents, the whole constructed and arranged substantially as and for purposes set forth.

2. Cast cylinder A with its mortised or recessed concave flange D, mortised or recessed concave flange or disk E, confining-screw F, in combination with the spokes, broad based or dovetailed one way and wedge-shaped the other, in their respective forms, or mechanical equivalents, the whole constructed and arranged substantially as and for purposes set forth.

3. The combination of the cast cylinder A having the concave recessed flange D, the adjustable concave recessed flange E, the flange-nut or confining-screw F, in their respective forms, or mechanical equivalents, with or without the removable axle-bearings *a a'*, the whole constructed and arranged substantially as and for the purposes set forth.

4. The vehicle-wheel hub complete, having either form of flange, spokes G in their trapezoidal or wedge-shape form one way, and dovetailed form the other, with or without removable axle-bearings *a a'*, thimble-screw tenon *e*, and the mitered or obliquely-cut and matched felly-joint *f*, the whole constructed and arranged substantially as described, and for the purposes set forth.

Witnesses: A. L. BLACKMAN.

THOMAS C. CONNOLLY,

JNO. A. BROWN.

26673.